(12) United States Patent
Shimoda et al.

(10) Patent No.: US 11,504,909 B2
(45) Date of Patent: Nov. 22, 2022

(54) 3-DIMENSIONAL OBJECT-FORMING APPARATUS

(71) Applicant: HONDA MOTOR CO., LTD., Tokyo (JP)

(72) Inventors: Akio Shimoda, Tochigi (JP); Keisuke Takahashi, Tochigi (JP); Kazunori Kawai, Tochigi (JP); Takaharu Echigo, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 16/766,930

(22) PCT Filed: Dec. 7, 2018

(86) PCT No.: PCT/JP2018/045050
§ 371 (c)(1),
(2) Date: May 26, 2020

(87) PCT Pub. No.: WO2019/124115
PCT Pub. Date: Jun. 27, 2019

(65) Prior Publication Data
US 2021/0023788 A1    Jan. 28, 2021

(30) Foreign Application Priority Data

Dec. 18, 2017 (JP) .............................. JP2017-241982

(51) Int. Cl.
*B29C 64/364*    (2017.01)
*B29C 64/153*    (2017.01)
(Continued)

(52) U.S. Cl.
CPC ............ *B29C 64/268* (2017.08); *B22F 3/101* (2013.01); *B22F 10/322* (2021.01);
(Continued)

(58) Field of Classification Search
CPC ........ B22F 10/32; B22F 10/322; B22F 10/77; B22F 3/101; B29C 64/364; B29C 64/25
See application file for complete search history.

(56) References Cited

U.S. PATENT DOCUMENTS

| 4,642,445 A * | 2/1987 | Stol ........................ B23K 26/12 |
| | | 219/121.84 |
| 9,005,513 B2 * | 4/2015 | Abe ........................ B22F 12/00 |
| | | 264/497 |

(Continued)

FOREIGN PATENT DOCUMENTS

| DE | 102010052206 A1 * | 5/2012 | ............. B22F 10/20 |
| JP | 2006-124732 | 5/2006 | |

(Continued)

OTHER PUBLICATIONS

International Search Report, dated Mar. 12, 2019 (dated Mar. 12, 2019), 1 page.

*Primary Examiner* — Atul P. Khare
(74) *Attorney, Agent, or Firm* — Rankin, Hill & Clark LLP (57) ABSTRACT

A 3-dimensional object-forming apparatus is provided which may avoid lowering of irradiation efficiency of laser light due to fumes and so forth while avoiding lowering of quality of the formed object. A shroud 20 includes an inside partition wall portion 21 that demarcates an inside space $S_1$ which extends from one end opening 202 to another end opening 206, and an outside partition wall portion 22 that opens in the other end opening 206 of a shroud 20 on an outside of the inside space $S_1$ and demarcates, together with the inside partition wall portion 21, an outside space $S_2$ which closes in a position closer to the one end opening 202 than the other end opening 206 of the shroud. A ventilation area of the inside space $S_1$ in the other end opening 206 of the shroud 20 is larger than the ventilation area of the inside (Continued)

space $S_1$ in an upstream portion closer to the one end opening 202 than the other end opening 206.

11 Claims, 5 Drawing Sheets

(51) Int. Cl.
  *B29C 64/268* (2017.01)
  *B29C 64/286* (2017.01)
  *B29C 64/25* (2017.01)
  *B29C 64/30* (2017.01)
  *B22F 3/10* (2006.01)
  *B22F 10/322* (2021.01)
  *B33Y 30/00* (2015.01)
  *B22F 10/77* (2021.01)

(52) U.S. Cl.
  CPC ............ *B29C 64/153* (2017.08); *B29C 64/25* (2017.08); *B29C 64/286* (2017.08); *B29C 64/30* (2017.08); *B29C 64/364* (2017.08); *B22F 10/77* (2021.01); *B33Y 30/00* (2014.12)

(56) References Cited

U.S. PATENT DOCUMENTS

| | | | | |
|---|---|---|---|---|
| 9,073,264 | B2* | 7/2015 | Abe | B33Y 30/00 |
| 9,604,410 | B2* | 3/2017 | Okazaki | B29C 64/153 |
| 9,669,583 | B2* | 6/2017 | Ferrar | B29C 64/20 |
| 9,776,362 | B2* | 10/2017 | Chuang | B29C 64/393 |
| 9,931,789 | B2* | 4/2018 | Wiesner | B22F 12/70 |
| 10,442,001 | B2* | 10/2019 | Jakimov | B22F 3/1007 |
| 10,493,562 | B2* | 12/2019 | Dimter | B29C 64/393 |
| 10,549,346 | B2* | 2/2020 | Yasuda | B22F 12/00 |
| 10,682,701 | B2* | 6/2020 | Wilkes | B29C 64/371 |
| 11,033,968 | B2* | 6/2021 | Sutcliffe | B22F 10/70 |
| 11,167,353 | B2* | 11/2021 | Ullmann | B28B 1/001 |
| 2018/0126650 | A1* | 5/2018 | Murphree | B08B 5/04 |
| 2020/0039000 | A1* | 2/2020 | Sweetland | B23K 26/1438 |

FOREIGN PATENT DOCUMENTS

| | | | |
|---|---|---|---|
| JP | 2012224919 A | * 11/2012 | |
| JP | 2017-177557 | 10/2017 | |
| JP | 2017-203199 | 11/2017 | |
| JP | 2017-206744 | 11/2017 | |
| WO | WO-9208592 A1 | * 5/1992 | B22F 12/00 |

* cited by examiner

3-DIMENSIONAL OBJECT-FORMING APPARATUS

TECHNICAL FIELD

The present invention relates to a 3-dimensional object-forming apparatus.

BACKGROUND ART

Figure 4:
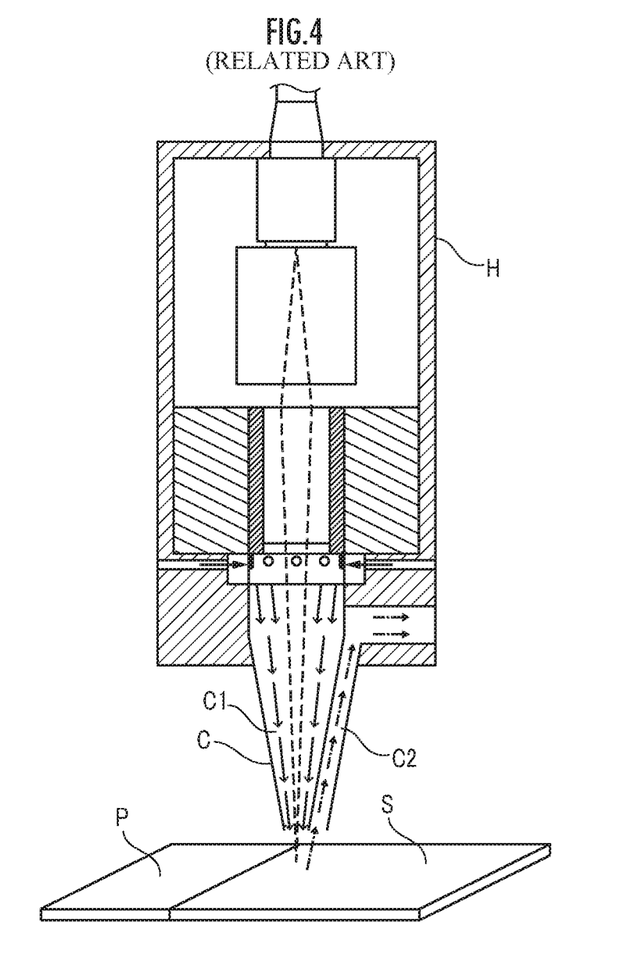
FIG. 4 is an explanatory diagram about a configuration of a 3-dimensional object-forming apparatus in related art.

In a 3-dimensional object-forming apparatus, for example, as illustrated in FIG. 4, a process is repeated in which a material powder layer P is formed by uniformly sprinkling material powder onto an object-forming table, a prescribed part of the material powder layer P is irradiated with laser light (see the broken lines) and is sintered, and a sintered layer S is thereby formed. Accordingly, an object in a desired shape which is formed of a laminated body of plural sintered layers S is fabricated (for example, see Patent Literature 1).

It is necessary to prevent lowering of irradiation efficiency of the laser light due to fumes produced in an object-forming area when forming the sintered layer S. Consequently, a cover unit C that opens toward the object-forming area has an inactive gas supply cover that discharges inactive gas (see the solid line arrows) through a discharge port to the object-forming area, and a fume drawing cover C2 that draws inactive gas including fumes (see the one-dot-chain lines) through a drawing port. Further, at least one of the position of a holder H that supports the cover unit C and the direction of the cover unit C is controlled, in accordance with the irradiation route of the laser light such that the laser light passes through an internal portion of an inactive gas supply cover C1 and the object-forming area is irradiated with the laser light.

CITATION LIST

Patent Literature

Patent Literature 1
  Japanese Patent Laid-Open No. 2017-203199

SUMMARY OF INVENTION

Technical Problem

However, in a case where inactive gas discharged toward an object-firming area through a discharge port of an inactive gas supply cover C1 blows up a portion of powder of a powder layer P that is present in an object-forming area, lowering of quality of an object possibly occurs such as formation of a defect in the object formed by laminating sintered layers S of the powder. Particularly, as illustrated in FIG. 4, this problem becomes significant in a case where the inactive gas supply cover C1 is formed to be gradually narrower towards the discharge port.

Consequently, an object of the present invention is to provide a 3-dimensional object-forming apparatus that avoids lowering of irradiation efficiency of laser light due to fumes or the like while avoiding lowering the quality of an object.

Solution to Problem

The present invention relates to a 3-dimensional object-forming apparatus including: a laser irradiation unit that has an optical system; a shroud that has an inside space which extends from one end opening to another end opening; and a protection member that is arranged in the one end opening of the shroud, configured to transmit laser light emitted from the laser irradiation unit through the inside space of the shroud and to pass the laser light through the other end opening to an external space of the shroud, and configured to isolate the laser irradiation unit from the inside space of the shroud, in which a 3-dimensional object is formed by repeating a process in which a powder layer formed in an object-forming area is irradiated with the laser light emitted from the laser irradiation unit through the inside space of the shroud while an irradiation position is changed by a driving mechanism, and powder which configures the powder layer is sintered or melt-solidified.

In the 3-dimensional object-forming apparatus of the present invention, the shroud includes: an inside partition wall portion which demarcates the inside space and in which an air supply port for supplying air to the inside space is provided in a position closer to the one end opening of the shroud than the other end opening of the shroud; and an outside partition wall portion that opens in the other end opening of the shroud on an outside of the inside space, demarcates, together with the inside partition wall portion, an outside space which closes in a position closer to the one end opening than the other end opening of the shroud, and is provided with an exhaust port for exhausting air from the outside space, and a ventilation area of the inside space in the other end opening is larger than the ventilation area of the inside space in an upstream portion closer to the one end opening than the other end opening.

In the 3-dimensional object-forming apparatus in the configuration, the process is repeated in which the powder layer formed in the object-forming area is irradiated with the laser light emitted from the laser irradiation unit through the inside space of the shroud while the irradiation position is changed by the driving mechanism and the powder which configures the powder layer is sintered or melted and solidified. Accordingly, an object in a desired 3-dimensional shape is obtained.

Here, the shroud has a double structure in a point that the shroud has the "inside space" that is demarcated by the inside partition wall portion and causes the one end opening to communicate with the other end opening and the "outside space" that is demarcated by the inside partition wall portion and the outside partition wall portion, opens in the other end opening of the shroud, and closes in a position closer to the one end opening than the other end opening of the shroud. Thus, in the process, inactive gas is introduced into the inside space through the air supply port provided to the inside partition wall portion, and the inactive gas that includes fumes is forced to flow from the inside space to the outside space in the other end opening of the shroud and is led out from the exhaust port provided to the outside partition wall portion to an external space of the shroud. This prevents pollution, with fumes, of the protection member that isolates the laser irradiation unit from the inside space of the shroud, lowering of transmittance of the laser light in the protection member, and further lowering of irradiation intensity of the laser light.

Further, the ventilation area of the inside space in the other end opening of the shroud is larger than the ventilation area of the inside space in the upstream portion closer to the one end opening than the other end opening of the shroud. "Ventilation area" means an area, of a 2-dimensional region surrounded by the inside partition wall portion in a plane whose vertical direction is an extending direction of the inside space, for example. Thus, lowering of the flow velocity of the inactive gas that flows through the inside space is intended more in the other end opening of the shroud than the upstream portion of the shroud, and blowing up or scattering of the powder that configures the powder layer is prevented in accordance with the lowering. Accordingly, a situation such as occurrence of a defect to an object is avoided, and lowering of quality of the object is further prevented.

It is preferable that the ventilation area of the inside space intermittently or continuously increase from the upstream portion to the other end opening.

In the 3-dimensional object-forming apparatus in the configuration, intermittent or continuous lowering of the flow velocity of the inactive gas that flows through the inside space is intended from the upstream portion of the shroud to the other end opening of the shroud, and blowing up or scattering of the powder that configures the powder layer is prevented in accordance with the lowering. Accordingly, a situation such as occurrence of a defect to an object is avoided, and lowering of quality of the object is further prevented.

It is preferable that the ventilation area of the inside space intermittently or continuously increase from a portion provided with the air supply port as the upstream portion to the other end opening.

In the 3-dimensional object-forming apparatus in the configuration, intermittent or continuous lowering of the flow velocity of the inactive gas that flows through the inside space is intended from the portion provided with the air supply port as the upstream portion of the shroud to the other end opening of the shroud, and blowing up or scattering of the powder that configures the powder layer is prevented in accordance with the lowering. Accordingly, a situation such as occurrence of a defect to an object is avoided, and lowering of quality of the object is further prevented.

It is preferable that with respect to an extending direction of the inside space of the shroud, an end portion of the outside partition wall portion in the other end opening of the shroud be positioned farther than an end portion of the inside partition wall portion in the other end opening of the shroud.

In the 3-dimensional object-forming apparatus in the configuration, the inactive gas including fumes, which flows from the inside space to the outside through a gap between the end portion of the inside partition wall portion and the powder layer is certainly guided to the outside space by the end portion of the outside partition wall portion. Thus, the inactive gas that includes fumes is inhibited from immediately flowing out from the inside space to the external space of the shroud through the gap between the end portion of the inside partition wall portion and the powder layer, and in addition, the powder that is present around and configures the powder layer is thereby inhibited from being scattered.

It is preferable that the air supply port provided to the inside partition wall portion be configured to introduce inactive gas into the inside space and toward a route of the laser light.

In the 3-dimensional object-forming apparatus in the configuration, the fumes present in the inside space are removed from the route of the laser light, and further prevention of lowering of the irradiation intensity of the laser light in the powder layer is intended.

It is preferable that the exhaust port provided to the outside partition wall portion be provided in a position closer to the one end opening than the other end opening of the shroud.

In the 3-dimensional object-forming apparatus in the configuration, compared to a case where the exhaust port is provided to the outside partition wall portion in a position close to the other end opening of the shroud, a situation is certainly avoided in which turbulence of the inactive gas which includes fumes in the other end opening of the shroud occurs and scattering of the powder which configures the powder layer is induced.

DESCRIPTION OF EMBODIMENTS

First Embodiment (Configuration)

Figure 1:
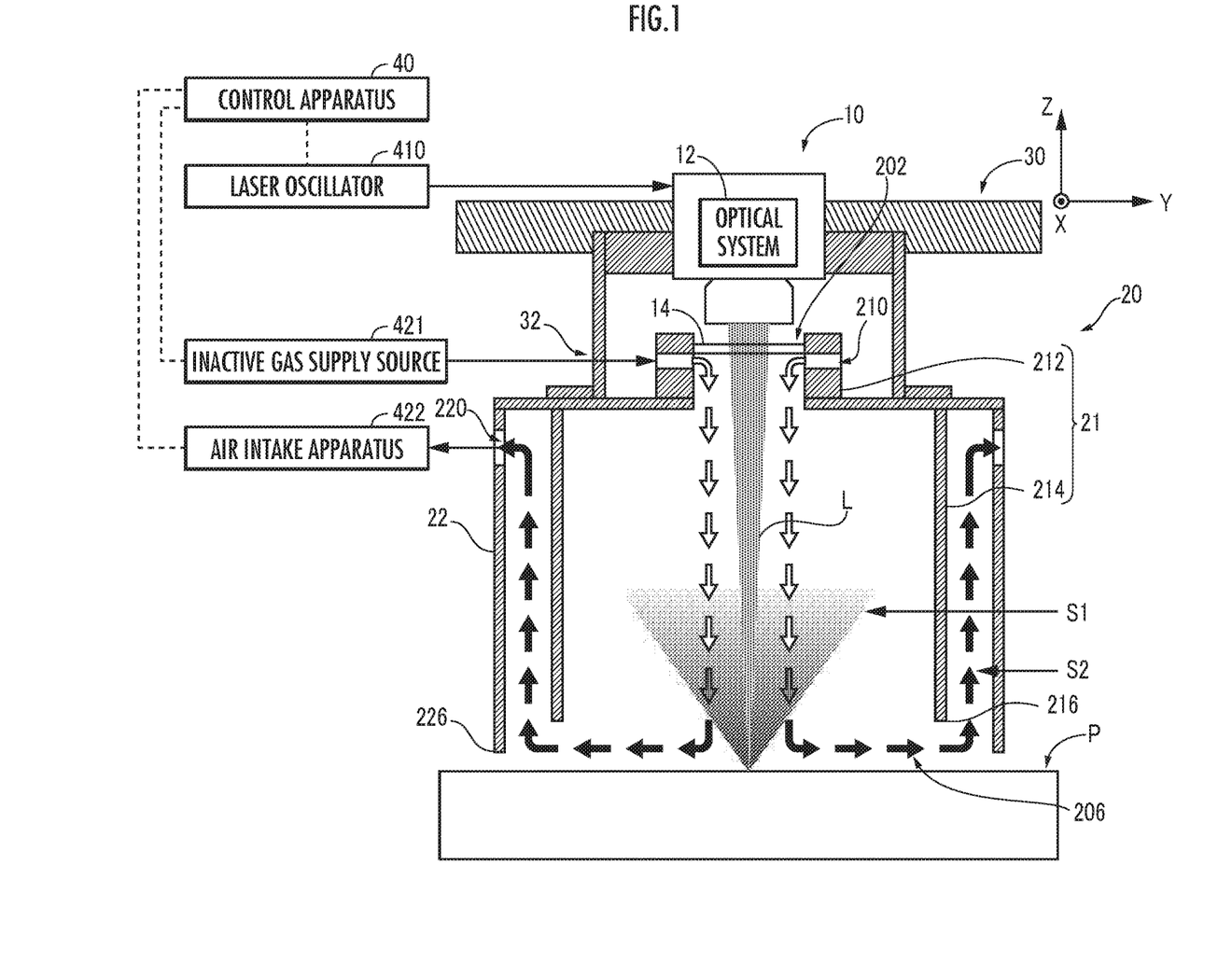
FIG. 1 is an explanatory diagram about a configuration of a 3-dimensional object-forming apparatus as a first embodiment of the present invention.

A 3-dimensional object-forming apparatus as a first embodiment of the present invention, which is illustrated in FIG. 1, includes a laser irradiation unit 10, a protection member 14, a shroud 20, and a driving mechanism 30.

The laser irradiation unit 10 has an optical system 12 that is configured with a galvano scanner, for example, and is configured with galvano mirrors, a condenser lens, and so forth. The laser irradiation unit 10 is configured to irradiate an external portion, via the optical system 12, with the laser light that is produced by oscillation by a laser oscillator 410 whose operation is controlled by a control apparatus 40.

The shroud 20 is formed into a general tubular shape with a top portion, in which an upper end wall opens in a central portion and side walls have double structures. Specifically, the shroud 20 has a generally tubular-shaped inside partition wall portion 21 that demarcates an inside space $S_1$ and a generally tubular-shaped outside partition wall portion 22 that demarcates, together with the inside partition wall portion 21, an outside space $S_2$ on the outside of the inside space $S_1$. The inside space $S_1$ extends from one end opening 202 (upper end opening) to another end opening 206 (lower end opening) of the shroud 20. The outside space 52 opens in the other end opening 206 (lower end portion) of the shroud 20 and closes in a position (upper end portion) closer to the one end opening 202 than the other end opening 206 of the shroud 20.

With respect to an extending direction (Z direction or vertical direction) of the inside space $S_1$ of the shroud 20, an end portion 226 (lower end portion) of the outside partition wall portion 22 in the other end opening 206 of the shroud 20 is positioned farther than (that is, below) an end portion 216 of the inside partition wall portion 21 in the other end opening 206 of the shroud 20.

The inside partition wall portion 21 has a shape in which a generally tubular-shaped inside partition wall upper portion 212 is coaxially coupled with a generally tubular-shaped inside partition wall lower portion 214 with a larger opening area than the inside partition wall upper portion 212 via a generally flange-shaped portion that protrudes outward from a lower end portion of the inside partition wall upper portion 212. Thus, a ventilation area (cross-sectional area) of the inside space $S_1$ in the other end opening 206 of the shroud 20 is larger than the ventilation area (cross-sectional area) of the inside space $S_1$ in the inside partition wall upper portion 212 as an upstream portion closer to the one end opening 202 than the other end opening 206. That is, the ventilation area of the inside space $S_1$ intermittently increases from an upstream portion of the shroud 20 to the other end opening 206.

An air supply port 210 is provided to the inside partition wall upper portion 212 of the inside partition wall portion 21. A supply source 421 of inactive gas such as $N_2$ gas is connected with the air supply port 210. For example, an operation of a flow regulation valve (not illustrated) that configures the inactive gas supply source 421 is controlled by the control apparatus 40, and the inactive gas (see the white arrows) is thereby introduced from the inactive gas supply source 421 into the inside space $S_1$ of the shroud 20 through the air supply port 210 provided to the inside partition wall portion 21.

Figure 2A:
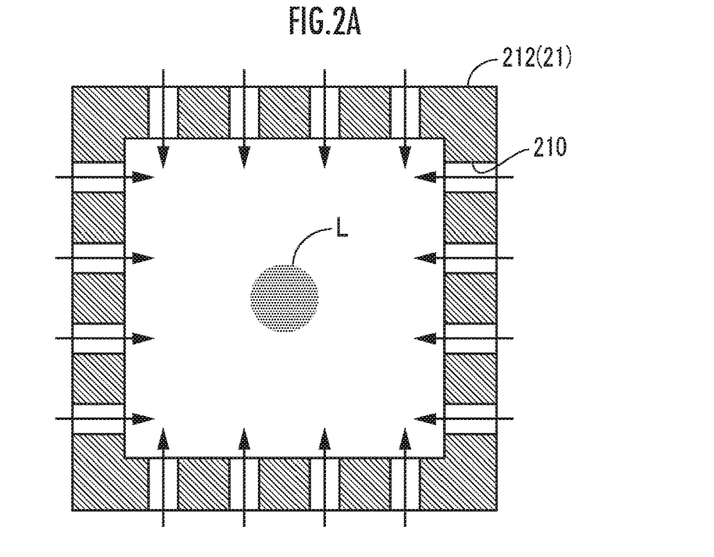
FIG. 2A is an explanatory diagram of an example about an air supply port.
Figure 2B:
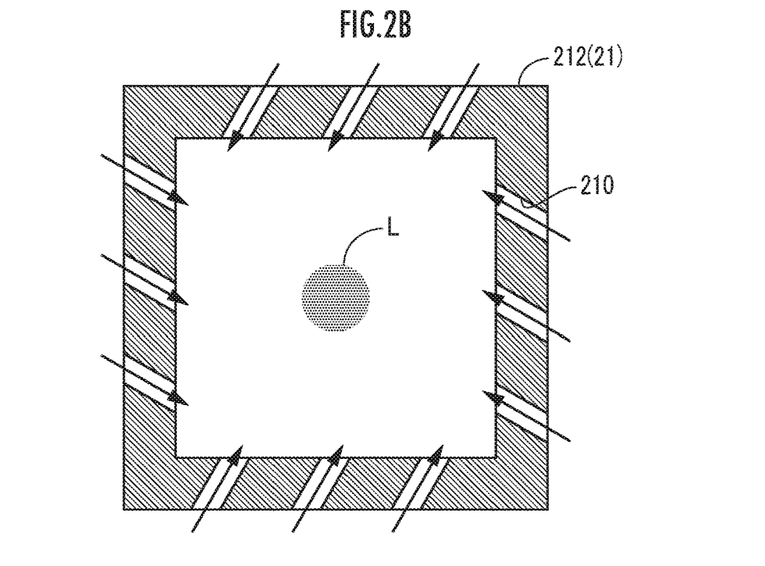
FIG. 2B is an explanatory diagram of another example about the air supply port.
Figure 2C:
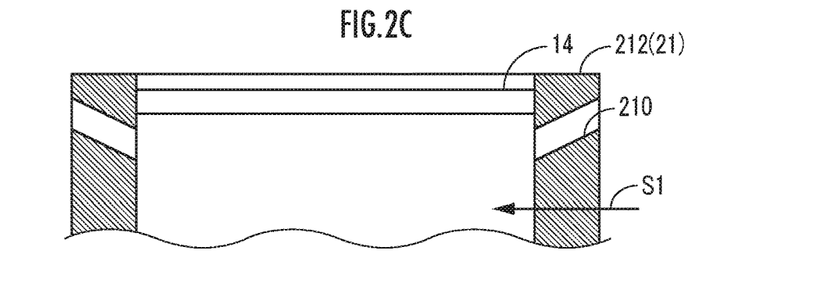
FIG. 2C is an explanatory diagram of a modification example about the air supply port.

The air supply port 210 is designed such that various positions, attitudes (extending forms), and numbers of air supply ports 210 are employed. For example, as illustrated in FIG. 2A, the inside partition wall upper portion 212 in a generally rectangular tubular shape may be provided with plural air supply ports 210 that pass through the inside partition wall upper portion 212 in the respective vertical directions with respect to four sides of the rectangular shape. As illustrated in FIG. 2B, the inside partition wall upper portion 212 in the generally rectangular tubular shape may be provided with plural air supply ports 210 that pass through the inside partition wall upper portion 212 in respective inclined directions with respect to the four sides of the rectangular shape. As illustrated in FIG. 2C, the air supply ports 210 may be provided to the inside partition wall upper portion 212 such that the air supply ports 210 are not in parallel with the horizontal direction but extend to be inclined with respect to the horizontal direction. In the inside partition wall lower portion 214, the air supply port 210 may be provided in a position closer to the one end opening 202 than the other end opening 206 of the shroud 20. In any case, the extending form of the air supply port 210 is preferably designed such that the inactive gas is introduced into the inside space $S_1$ and toward a route of laser light L.

The inside partition wall upper portion 212 may be formed into a cylindrical shape, a parallelogram tubular shape, or a polygonal tubular shape (such as a regular hexagonal tubular shape), other than the generally rectangular tubular shape.

Figure 2D:
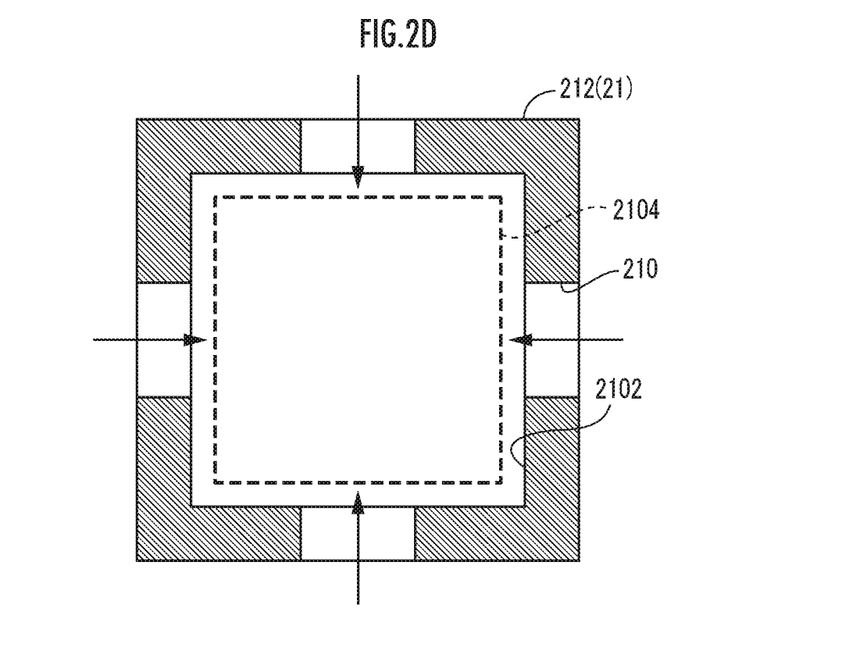
FIG. 2D is an explanatory diagram of a modification example about the air supply port.
Figure 2E:
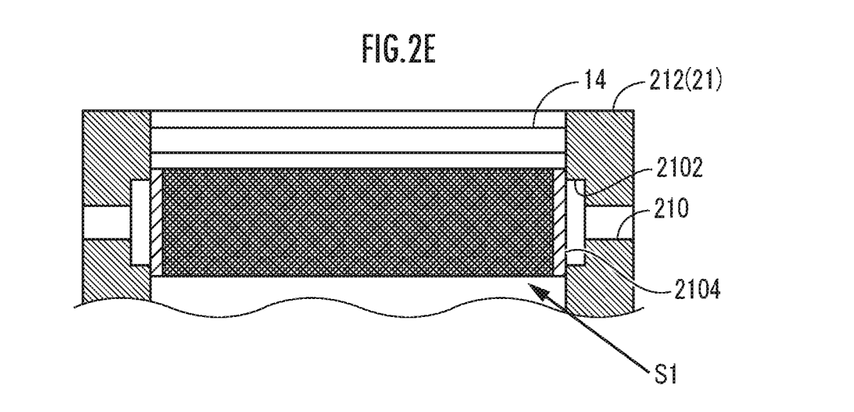
FIG. 2E is an explanatory diagram about the modification example of the air supply port.

As illustrated in FIG. 2D and FIG. 2E, a recessed groove 2102 is formed throughout the whole periphery of an inner peripheral wall of the inside partition wall upper portion 212, and an air-permeable member 2104 formed with meshes may further be provided throughout the whole periphery of the inner peripheral wall of the inside partition wall upper portion 212 so as to partition the recessed groove 2102 from the inside space $S_1$ of the shroud 20. The recessed groove 2102 communicates with the air supply ports 210. In this case, the inactive gas is supplied to the inside space $S_1$ of the shroud 20 through the air supply ports 210, the recessed groove 2102, and the air-permeable member 2104. The air-permeable member 2104 prevents a situation in which the recessed groove 2102 and further the air supply ports 210 are polluted with fumes.

An exhaust port 220 is provided to the outside partition wall portion 22. An intake apparatus 422 configured with an air intake pump and so forth is connected with the exhaust port 220. For example, an operation of the air intake apparatus 422 is controlled by the control apparatus 40, and the inactive gas (see the black arrows) that includes fumes is thereby led out from the outside space $S_2$ of the shroud 20 to an external portion of the shroud 20 through the exhaust port 220 provided to the outside partition wall portion 22.

The exhaust port 220 is designed such that various positions, attitudes (extending forms), and numbers of exhaust ports 220 are employed. For example, the exhaust port 220 may be provided in a position closer to the one end opening 202 than the other end opening 206 of the shroud 20.

The protection member 14 is arranged in the one end opening 202 of the shroud 20 such that the laser irradiation unit 10 is isolated from the inside space $S_1$ of the shroud 20. The protection member 14 is formed of a material that is transparent for the laser light L such as quartz glass. Thus, the protection member 14 enables the laser light L emitted from the laser irradiation unit 10 to be transmitted through the inside space $S_1$ of the shroud 20 and to pass through the other end opening 206 to an external space of the shroud 20.

The driving mechanism 30 is a mechanism for changing an irradiation position of the laser light L emitted from the laser irradiation unit 10 with respect to the powder layer P formed in an object-forming area. The driving mechanism 30 is configured with an XY gantry that supports the laser irradiation unit 10 and supports the shroud 20 below the laser irradiation unit 10 via a support member 32, for example. The laser irradiation unit 10 and the shroud 20 are moved in two orthogonal directions in parallel with the horizontal direction (X direction and Y direction) without changing relative positions and attitudes. The driving mechanism 30 may be configured with a driving mechanism that adjusts angles of gantry mirrors which configure the optical system 12 of the laser irradiation unit 10. The driving mechanism 30 may have an elevation driving mechanism that displaces the laser irradiation unit 10 and the shroud 20 in Z direction.

The 3-dimensional object-forming apparatus may include a powder supply apparatus that supplies powder to the object-forming area, a powder leveling apparatus that forms the powder layer P by leveling powder (for example, see Japanese Patent No. 6167195), and some or all of the control apparatus 40, the laser oscillator 410, an inactive gas supply apparatus 421, and the air intake apparatus 422, as configuration elements.

(Action and Effect)

In the 3-dimensional object-forming apparatus as the first embodiment of the present invention, a process is repeated in which the powder layer P formed in the object-forming area is irradiated with the laser light L emitted from the laser irradiation unit 10 through the inside space $S_1$ of the shroud 20 while the irradiation position is changed by the driving mechanism 30 and the powder which configures the powder layer P is sintered or melted and solidified. Accordingly, an object in a desired 3-dimensional shape is obtained.

Here, because the shroud 20 has a double structure in a point that the shroud 20 has the inside space $S_1$ and the outside space $S_2$, in the process, the inactive gas is introduced into the inside space $S_1$ through the air supply ports 210 provided to the inside partition wall portion 21 (see the outline arrows in FIG. 1). The inactive gas that includes fumes is forced to flow from the inside space $S_1$ to the outside space $S_2$ in the other end opening 206 of the shroud 20 and is led out through the exhaust port 220 provided to the outside partition wall portion 22 to the external space of the shroud 20 (see the black arrows in FIG. 1). This prevents pollution, with fumes, of the protection member 14 that isolates the laser irradiation unit 10 from the inside space $S_1$ of the shroud 20, lowering of transmittance of the laser light L in the protection member 14, and further lowering of irradiation intensity of the laser light L with respect to the powder layer P.

Further, the ventilation area of the inside space $S_1$ in the other end opening 206 of the shroud 20 is larger than the ventilation area of the inside space $S_1$ in the upstream portion (inside partition wall upper portion 212) closer to the one end opening 202 than the other end opening 206 of the shroud 20. Thus, lowering of the flow velocity of the inactive gas that flows through the inside space $S_1$ is intended more in the other end opening 206 of the shroud 20 than the upstream portion of the shroud 20, and blowing up or scattering of the powder that configures the powder layer P is prevented in accordance with the lowering. Accordingly, a situation such as occurrence of a defect to an object is avoided, and lowering of quality of the object is further prevented.

In addition, the lower end portion 226 of the outside partition wall portion 22 is positioned below the lower end portion 216 of the inside partition wall portion 21. Thus, the inactive gas including fumes, which flows from the inside space $S_1$ to the outside through a gap between the lower end portion 216 of the inside partition wall portion 21 and the powder layer P, is certainly guided to the outside space $S_2$ by the lower end portion 226 of the outside partition wall portion 22 (see the black arrows in FIG. 1). Thus, the inactive gas that includes fumes is inhibited from immediately flowing out from the inside space $S_1$ to the external space of the shroud 20 through the gap between the lower end portion 216 of the inside partition wall portion 21 and the powder layer P, and in addition, the powder that is present around and configures the powder layer P is thereby inhibited from being scattered.

Second Embodiment (Configuration)

Figure 3:
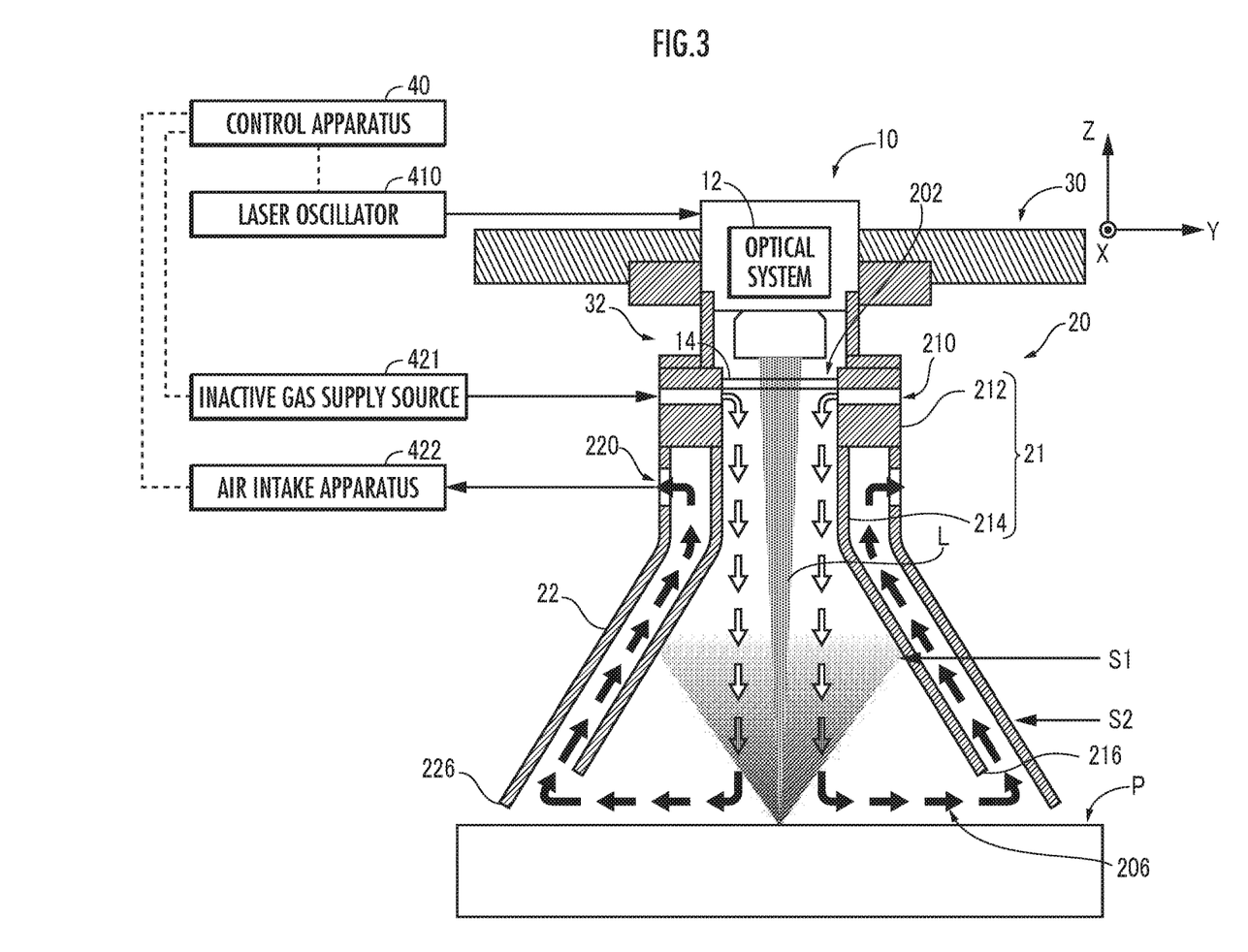
FIG. 3 is an explanatory diagram about a configuration of a 3-dimensional object-forming apparatus as a second embodiment of the present invention.

A 3-dimensional object-forming apparatus as a second embodiment of the present invention, which is illustrated in FIG. 3, has similar configurations to the 3-dimensional object-forming apparatus as the first embodiment of the present invention (see FIG. 1 and FIG. 2A to FIG. 2C) except the shroud 20. Thus, the same reference characters are used for the similar configurations, and descriptions thereof will not be made.

The inside partition wall portion 21 has a shape in which the generally tubular-shaped inside partition wall upper portion 212 is coaxially coupled with the generally tubular-shaped inside partition wall lower portion 214 whose opening area gradually becomes larger from an upper end portion to a lower end portion. Thus, the ventilation area of the inside space $S_1$ increases not intermittently but "continuously" from an upstream portion of the shroud 20 to the other end opening 206.

The outside partition wall portion 22 is formed into a shape whose opening area gradually becomes larger from an upper end portion to a lower end portion in accordance with the shape of the inside partition wall lower portion 214.

(Action and Effect)

In the 3-dimensional object-forming apparatus as the second embodiment of the present invention, the ventilation area of the inside space $S_1$ continuously increases from the upstream portion (inside partition wall upper portion 212) of the shroud 20 to the other end opening 206. Thus, continuous lowering of the flow velocity of the inactive gas that flows through the inside space $S_1$ is intended more in the other end opening 206 of the shroud 20 than the upstream portion of the shroud 20, and blowing up or scattering of the powder that configures the powder layer P is prevented in accordance with the lowering. Accordingly, similarly to the 3-dimensional object-forming apparatus as the first embodiment of the present invention, a situation such as occurrence of a defect to an object is avoided, and lowering of quality of the object is further prevented.

Other Embodiments of the Present Invention

In the above embodiment, the inside space $S_1$ is surrounded throughout the whole periphery by the single outside space $S_2$ with an annular cross section. However, as another embodiment, the inside partition wall portion 21 and the outside partition wall portion 22 may be configured such that plural outside space $S_2$ are intermittently arranged on the outside of the inside space $S_1$. For example, one or plural outside spaces may be formed with one or plural outside partition wall portions in a general gutter shape whose lower end portion opens but upper end portion is closed and an inside partition wall portion.

REFERENCE SIGNS LIST 10 laser irradiation unit
12 optical system
14 protection member
20 shroud
21 inside partition wall portion
22 outside partition wall portion
30 driving mechanism
40 control apparatus
202 one end opening
206 other end opening
210 air supply port
220 exhaust port
410 laser oscillator
421 inactive gas supply apparatus
422 drawing apparatus
$S_1$ inside space
$S_2$ outside space

The invention claimed is:
1. A 3-dimensional object-forming apparatus comprising:
a laser irradiation unit that has an optical system;
a shroud that has an inside space which extends from one end opening to another end opening; and
a protection member that is arranged in the one end opening of the shroud and configured to isolate the laser irradiation unit from the inside space of the shroud, the protection member being configured to transmit laser light emitted from the laser irradiation unit therethrough into the inside space of the shroud and through the other end opening to an external space of the shroud, wherein a 3-dimensional object is formed by repeating a process in which a powder layer formed in an associated object-forming area is irradiated with the laser light emitted from the laser irradiation unit through the inside space of the shroud while an irradiation position of the laser light is changed by an associated driving mechanism, and powder which configures the powder layer is sintered or melt-solidified, the shroud includes:

an inside partition wall portion which demarcates the inside space and in which an air supply port for supplying air to the inside space is provided at a position closer to the one end opening of the shroud than the other end opening of the shroud; and an outside partition wall portion which opens in the other end opening of the shroud on an outside of the inside space, and which demarcates, together with the inside partition wall portion, an outside space which closes in a position closer to the one end opening than the other end opening of the shroud, and the outside partition wall portion is provided with an exhaust port for exhausting air from the outside space, a ventilation area of the inside space at the other end opening is larger than a ventilation area of the inside space at an upstream portion closer to the one end opening than the other end opening, and with respect to an extending direction of the inside space of the shroud, an end portion of the outside partition wall portion at the other end opening of the shroud is positioned farther than an end portion of the inside partition wall portion at the other end opening of the shroud.

2. The 3-dimensional object-forming apparatus according to claim 1, wherein
the ventilation area of the inside space continuously increases from the upstream portion to the other end opening.

3. The 3-dimensional object-forming apparatus according to claim 2, wherein the outside partition wall portion is provided to be parallel to the inside partition wall portion at an area in the extending direction of the inside space of the shroud at which the ventilation area of the inside space continuously increases from the upstream portion to the other end opening.

4. The 3-dimensional object-forming apparatus according to claim 1, wherein
the ventilation area of the inside space continuously increases from a portion provided with the air supply port as the upstream portion to the other end opening.

5. The 3-dimensional object-forming apparatus according to claim 4, wherein the outside partition wall portion is provided to be parallel to the inside partition wall portion at an area in the extending direction of the inside space of the shroud at which the ventilation area of the inside space continuously increases from the portion provided with the air supply port as the upstream portion to the other end opening.

6. The 3-dimensional object-forming apparatus according to claim 1, wherein
the air supply port provided to the inside partition wall portion is configured to introduce inactive gas into the inside space and toward a route of the laser light.

7. The 3-dimensional object-forming apparatus according to claim 1, wherein
the exhaust port defined through the outside partition wall portion is provided in a position closer to the one end opening than the other end opening of the shroud.

8. The 3-dimensional object-forming apparatus according to claim 1, wherein the protection member is formed of a material that is transparent for the laser light.

9. The 3-dimensional object-forming apparatus according to claim 1, wherein the protection member is formed of quartz glass.

10. The 3-dimensional object-forming apparatus according to claim 1, wherein
the ventilation area of the inside space intermittently increases from the upstream portion to the other end opening.

11. The 3-dimensional object-forming apparatus according to claim 1, wherein
the ventilation area of the inside space intermittently increases from a portion provided with the air supply port as the upstream portion to the other end opening.

* * * * *